US008406319B2

(12) United States Patent
Sayana et al.

(10) Patent No.: US 8,406,319 B2
(45) Date of Patent: Mar. 26, 2013

(54) CHANNEL ESTIMATOR WITH HIGH NOISE SUPPRESSION AND LOW INTERPOLATION ERROR FOR OFDM SYSTEMS

(75) Inventors: Krishna Kamal Sayana, Lakemoor, IL (US); Bryan S. Nollett, Champaign, IL (US); Xiangyang Zhuang, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1578 days.

(21) Appl. No.: 11/691,494

(22) Filed: Mar. 27, 2007

(65) Prior Publication Data

US 2012/0195397 A1    Aug. 2, 2012

(51) Int. Cl.
*H04K 1/10* (2006.01)
(52) U.S. Cl. ........................ 375/260; 375/316
(58) Field of Classification Search .................. 375/232, 375/260, 285, 350, 360, 340; 370/206, 208, 370/210, 252; 455/59
See application file for complete search history.

(56) References Cited

U.S. PATENT DOCUMENTS

| 7,675,983 B2 * | 3/2010 | Gorday et al. | 375/260 |
| 7,778,362 B2 * | 8/2010 | Shor | 375/340 |

FOREIGN PATENT DOCUMENTS

| EP | 1748610 A | 1/2007 |
| JP | 2005-130485 A | 5/2005 |
| JP | 2006-526299 A | 11/2006 |
| WO | 2004105335 A1 | 2/2004 |
| WO | 2005057870 A1 | 6/2005 |

OTHER PUBLICATIONS

Baoguo Yang, Letaief, K.B., Cheng, R.S. and Zhigang Cao "Windowed DFT based pilot-symbol-aided channel estimation for OFDM systems in multipath fading channels", Vehicular Technology Conference Proceedings, 2000. VTC 2000-Spring Tokyo. 2000 IEEE 51st.*
Auer, Gunther and Sand, Stephan and Dammann, Armin, "Comparison of Low complexity OFDM Channel Estimation Techniques", Proceedings of the 8th International OFDM Workshop, Sep. 24, 2003, pp. 157-161, Hamburg, Germany.
Gunther Auer, et al. "Comparison of Low Complexity OFDM Channel Estimation Techniques" Prceeding of the 8th International OFDM Workshop, Sep. 24, 2003, pp. 157-161, Germany.
Korean Intellectual Property Office, "Notice of Preliminary Rejection", Mar. 15, 2011, pp. 1-2, KORS Pat. Appln. No. 10-2009-7020103.
Ye Li et.al, Robust Channel Estimation for OFDM Systems with Rapid Dispersive Fading Channels, IEEE Transaction on Communications, vol. 46, No. 7, Jul. 1998.

(Continued)

*Primary Examiner* — Daniel Washburn
*Assistant Examiner* — Fitwi Hailegiorgis

(57) ABSTRACT

A receiver with DFT based channel estimation having good noise suppression for both high and low signal-to-noise ratios providing advantages over conventional DFT estimators and Minimum-Mean-Square-Error (MMSE) estimators. The use of MMSE may be incorporated for estimation at the band edges providing further improvements. The received signal in the time domain, is transformed to the frequency-domain received signal via an N-point FFT (501). The frequency-domain received signal at the pilot locations is then used to obtain a "noisy" channel estimates at the pilot subcarriers by dividing the known pilot symbols in (503). Uniformly spaced pilots are assumed over a window of usable subcarriers. Padding is applied to the initial channel estimates at both sides of the band to account for unused subcarriers such as guard spacing. Weighting factors during power estimation may take into account various noise characteristics such as combinations of known and time-limited noise power characteristics.

12 Claims, 12 Drawing Sheets

OTHER PUBLICATIONS

Lasaulce et.al, "Training Based Channel Estimation and De-noising for the UMTS TDD Mode", IEEE Vehicular Technology Conference (VTC 2001 Fall), Oct. 2001, pp. 1908-1911.

Japanese Patent Application, Office Action for Patent Application No. 2009-551765 dated Mar. 21, 2012, 2 pages.

Kobayashi, et al., "Proposal of OFDM Channel Estimation Method using Discrete Cosine Transform", Technical Report of IEICE, Nov. 13, 2003, vol. 103, No. 456, pp. 45-50, RCS2003-159.

Japanese Patent Office, "Notification of Reasons for Rejection", Jul. 17, 2012, Japanese Pat Appln. No. 2009-551765, 6 pages.

* cited by examiner

CHANNEL ESTIMATOR WITH HIGH NOISE SUPPRESSION AND LOW INTERPOLATION ERROR FOR OFDM SYSTEMS

FIELD OF THE DISCLOSURE

The present disclosure relates generally to communication systems, and more particularly to communication system receivers and methods and apparatuses for channel estimation, and even move particularly to Orthogonal Frequency Division Multiplexing (OFDM) receivers and channel estimators therefor.

BACKGROUND

Orthogonal Frequency Division Multiplexing (OFDM) has been adopted by various wireless standards such as IEEE 802.11a, 802.16, ETSI HIPERLAN/2 as well as digital video broadcasting (DVB). Channel estimation in OFDM systems involves channels that vary across the frequency domain subcarriers and also across OFDM symbols in time. Further, the pilot channels and reference symbols are transmitted sparsely in time and frequency. The channel at all other locations must be estimated using the channel statistics in time and frequency and the channel obtained on pilot locations.

The $3^{rd}$ Generation Partnership Project, Long Term Evolution (3GPP LTE) standards provide exemplary arrangements of reference symbol ("RS" or "R") on a given OFDM time-frequency resource. More particularly, various reference symbol locations are defined in 3GPP TS 36.211, *3GPP Technical Specification for Physical Channels and Modulation*, Section 5.6.1.2, "Physical resource mapping" (March 2007) which is incorporated by reference herein.

Techniques exist for channel estimation in OFDM systems based on scattered pilots, and channel estimators have been designed for various wireless standards such as IEEE802.16/WiMAX, 3GPP LTE, 3GPP2 Rev-C, IEEE 802.11, IEEE 802.20. Most of the corresponding receiver implementations, choose a frequency-domain filtering approach, such as Minimum Mean Square Error (MMSE), in which the channel at each subcarrier location is obtained after applying a filter over several neighboring pilot/reference symbols.

The MMSE filters are different for different subcarrier locations and for different operational Signal-to-Noise Ratio (SNR) conditions. They are also often pre-computed based on an assumed power-delay-profile (PDP). The most commonly applied PDP is the so-called "uniform PDP" which has a width in time equaling the duration of the entire OFDM cyclic prefix (CP).

However, if the pilot subcarriers are uniformly distributed with a spacing smaller than the coherence bandwidth, the so-called "DFT-based" channel estimator becomes feasible in which the IDFT operation on the pilots yields a time-domain channel. A DFT operation is then applied to convert the time-domain channel back to the frequency domain with a frequency resolution finer than the original pilot subcarrier sampling.

Since this type of estimator allows advanced processing of the time-domain channel based on an estimate of the actual PDP, it can provide significant performance gain to that of MMSE thanks to its superior noise suppression capability, especially at low SNRs which is critical for control channel coverage.

Unfortunately, at high SNR, existing "DFT-based" estimators are inferior to MMSE estimators for various reasons. For example an inherent aliasing issue exists. Just like limited time-domain sampling and windowing in the time domain will cause aliasing in the frequency domain, the time-domain channel after IDFT operation on the pilots will suffer from "temporal" aliasing, which exhibits itself as the leakage of power from the true channel tap to its neighboring taps.

Further, in some cases the spacing between pilot subcarriers may not always be maintained. For example, since the "DC subcarrier" is typically not usable for data or pilot in OFDM, it is often not counted when assigning pilots. As a result of DC exclusion, the pilots before and after the DC subcarrier will be one more subcarrier further apart. Special treatment is needed to address this issue.

Perhaps more importantly, a typical OFDM system employs guard subcarriers which are not usable for the system. Such a "windowing" in the frequency domain not only causes aliasing as discussed previously, but also creates an "edge effect" on channel estimation quality for subcarriers near both edges. DFT-based estimators suffer more performance degradation from this "edge effect" than MMSE, because DFT-based estimators enforce an artificial correlation between the two edges as if the spectrum is "wrap around," which is not true in a real channel. Techniques to further reduce the edge effect are thus needed.

In light of the above discussion, at low SNRs, the channel estimator should have good noise suppression, while at high SNRs, the channel estimator should have low interpolation errors, to avoid the capping of achievable SNR due to irreducible interpolation errors.

Therefore, an apparatus and method for channel estimation that can achieve the best performance under both low and high SNR conditions is needed. Furthermore, a channel estimation apparatus and method is needed wherein various interference characteristics are accounted for such that high performance may be obtained in interference-dominated or colored-noise environments such as those that may occur in an OFDM system.

DETAILED DESCRIPTION

Figure 1:
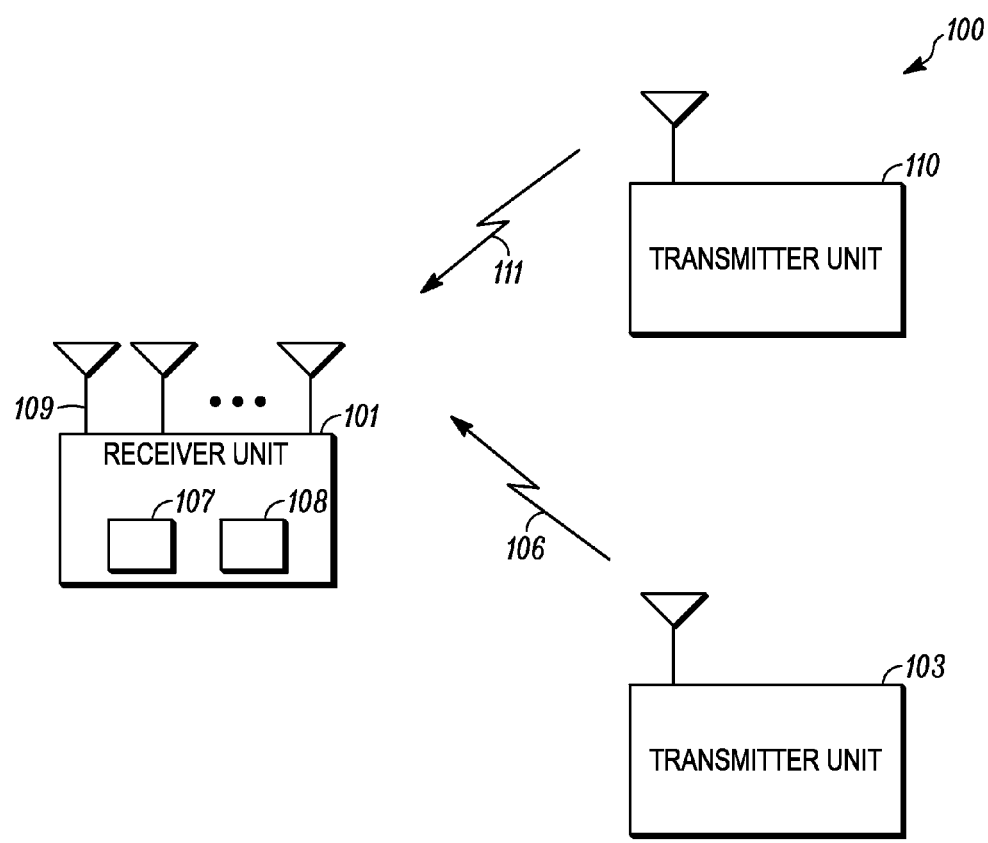
FIG. 1 is a block diagram of an Orthogonal Frequency Division Multiplexed (OFDM) network.

A method and apparatus which provides for channel estimation having the high noise suppression characteristic of DFT-based schemes, while achieving low interpolation error to avoid flooring at high Signal-to-Noise Ratios (SNRs) is provided herein.

In some embodiments, channel decoder inputs will be determined which may be considered generally to be a codeword component, the codeword being an encoded message encoded on a transmitting side, and a noise component.

In the various embodiments herein disclosed, various calculations may be performed for arbitrary channel estimators using a Discrete Fourier Transform (DFT) based approach which, in other embodiments may be used in combination with a frequency domain MMSE estimator. More particularly, in some embodiments, MMSE filters may be used to estimate various subcarriers, such as at edge subcarrier locations, and used in combination with DFT based estimations as disclosed in further details herein.

It will be appreciated that various computations such as, but not limited to, DFT, FFT, IDFT, IFFT computation, channel estimation and otherwise processing received signals may be performed in a dedicated device such as a receiver having a dedicated processor, a processor coupled to an analog processing circuit or receiver analog "front-end" with appropriate software for performing a receiver function, an application specific integrated circuit (ASIC), a digital signal processor (DSP), or the like, or various combinations thereof, as would be appreciated by one of ordinary skill. Memory devices may further be provisioned with routines and algorithms for operating on input data and providing output such as operating parameters to improve the performance of other processing blocks associated with, for example, reducing noise and interference, and otherwise appropriately handling the input data.

It will further be appreciated that wireless communications units may refer to subscriber devices such as cellular or mobile phones, two-way radios, messaging devices, personal digital assistants, personal assignment pads, personal computers equipped for wireless operation, a cellular handset or device, or the like, or equivalents thereof provided such units are arranged and constructed for operation in accordance with the various inventive concepts and principles embodied in exemplary receivers, and methods for decoding and/or otherwise performing signal processing including, but not limited to, channel estimation, and accounting for channel estimation noise and/or error as discussed and described herein. Further, receivers embodying the various inventive concepts and principles herein disclosed are not limited to those in wireless communications units but may also be incorporated into various transceivers such as those of base stations, etc.

The inventive functionality and inventive principles herein disclosed are best implemented with or in software or firmware programs or instructions and integrated circuits (ICs) such as digital signal processors (DSPs) or application specific ICs (ASICs) as is well known by those of ordinary skill in the art. Therefore, further discussion of such software, firmware and ICs, if any, will be limited to the essentials with respect to the principles and concepts used by the various embodiments.

Turning now to the drawings wherein like numerals represent like components, FIG. 1 illustrates an Orthogonal Frequency Division Multiplexed (OFDM) network 100. In such OFDM networks, a receiver 101 may includes one or more antennas 109 and receives channels on various time-frequency resources.

In the various embodiments receiver 101 will have receiver components 107, and at least components 108 which comprises a channel estimation component, a channel decoding component and a storage component.

Further network 100 may employ any of various modulation and coding schemes for the air interfaces between transmitters and receivers. For example, Quadrature Amplitude Modulation (QAM) may be employed including, but not limited to, 16-QAM, 64-QAM, etc. Additionally, various approaches to channelization of signals and/or subcarriers may be employed, such as but not limited to, Code Division Multiple Access (CDMA), Time Division Multiple Access (TDMA), etc. Further, such approaches may be used in combination with each other and/or other techniques such as Orthogonal Frequency Division Multiplexing (OFDM) such that various sub-carriers employ various channelization techniques.

Figure 2:
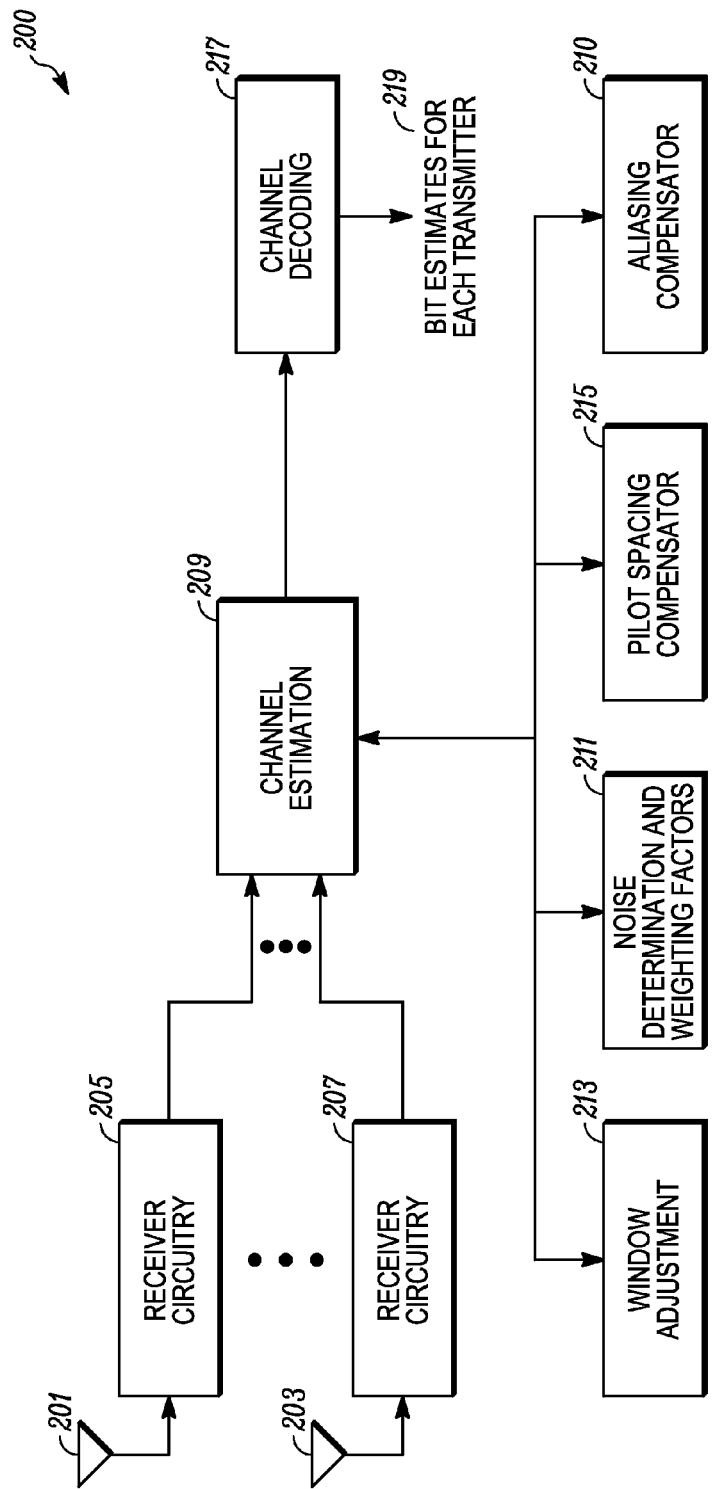
FIG. 2 is a block diagram illustrating high level components of a receiver in accordance with the various embodiments.

FIG. 2 illustrates high level components in accordance with a receiver embodiment for example, components 107 and 108 in FIG. 1. One or more antennas such as antenna 201 and antenna 203 provide inputs to respective receiver circuitries 205 and 207. Received inputs are, in general, demodulated according to the appropriate transmission strategies, resulting in an input to the channel decoder 217, which is, in general, a combination of a codeword and noise power. The channel decoder 217 then determines bit estimates 219 for each transmitter. The channel estimation circuitry 209 will provide the demodulator with the channel estimates between each receive antenna and each transmit antenna. In the embodiment illustrated by FIG. 2, the channel estimation circuitry 209 may employ Discrete Fourier Transformations (DFT) and/or Minimum Mean Square Error (MMSE) methods. The window adjustment 213 and pilot spacing compensator 215 provide features in the various embodiments as will be described in detail herein below. The noise determination and weighting factors module 211 may determine appropriate weighting factors based upon a noise and interference characteristic of a channel as will also be described in detail herein below.

Figure 3:
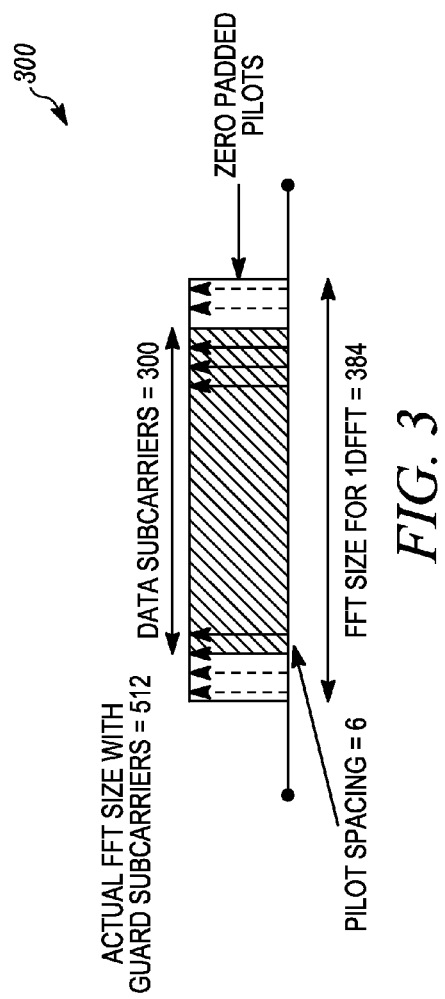
FIG. 3 is a diagram illustrating OFDM subcarriers and pilots having a given spacing and as applicable to a receiver in accordance with the various embodiments.

FIG. 3 provides an example of an OFDM pilot structure in the frequency domain in which an appropriate window is determined in accordance with the various embodiments. In the example of FIG. 3, pilots have a spacing of 6 and also employ guard subcarriers at the ends of the band. In accordance with the various embodiments, an FFT size will be determined rather than assuming a wrap around of the pilot band or zero-padding over the whole band as is typical in existing DFT-based channel estimators.

Figure 4:
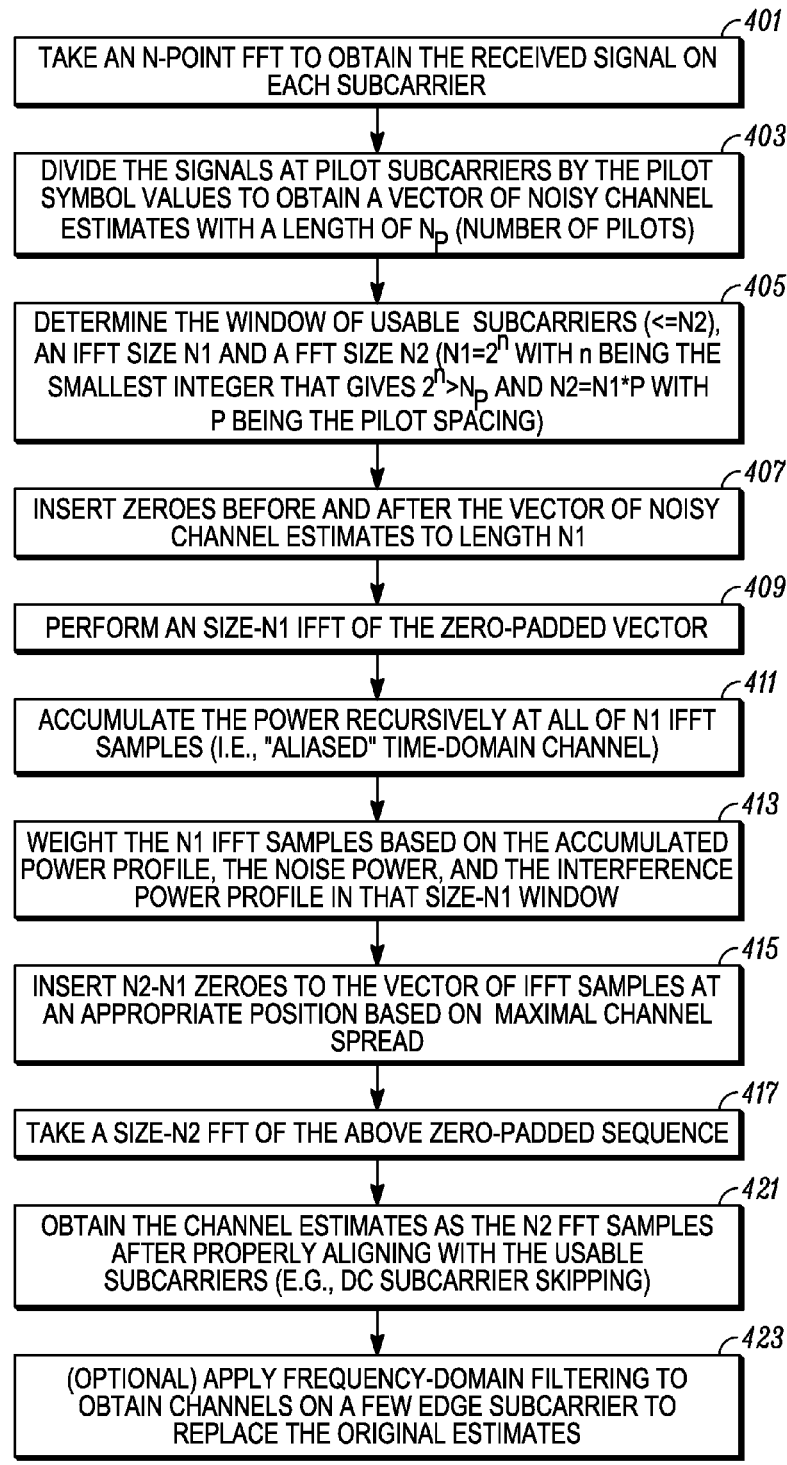
FIG. 4 is a flow chart illustrating a high level operation of a receiver in accordance with an embodiment.

A high level operational description of a receiver in accordance with the embodiments is illustrated by the flow chart of FIG. 4. The receiver receives the OFDM signals having a frequency domain structure similar to the example illustrated by FIG. 3, and proceeds as in 401. Thus, in 401, the received signal in the time domain, after A/D conversion to baseband, is transformed to the frequency-domain received signal via an N-point FFT. The frequency-domain received signal at the pilot locations is then used to obtain a "noisy" channel estimates at the pilot subcarriers by dividing the known pilot symbols in 403. "$N_p$" pilots are assumed that are uniformly spaced, wherein the pilot spacing is P (P−1 non-pilot subcarriers separated between the pilot subcarriers), over a window of usable subcarriers. The pilots may also be nearly, or pseudo, uniformly spaced. For example, where a DC subcarrier exists, the DC subcarrier is often removed before a uniformly-spaced pilot assignment, in which the two pilots around the DC subcarriers are actually separated by "P+1" subcarriers.

In 405, an IFFT size is determined as $N_1=2^n$, where n is an integer such that $2^n > N_p$. It is to be understood however, that this is an example only, and that, depending on implementation considerations a radix 3 ($3 \times 2^n > N_p$) or other may be used in place of radix 2, if found to give better performance in the various embodiments An FFT of size $N2=N1 \times P$ is also decided, where N2 is equal to or greater than the number of usable subcarriers. The usable subcarriers sit in the middle of this "subcarrier window" of size-N2. The channel estimates of N2 subcarriers will be obtained among which only those corresponding to the usable subcarriers will be kept. The rest of the N2 subcarriers on each edge are referred to as "unused" subcarriers.

In 407, zeros are inserted into the vector of $N_p$ noisy channel estimates on both sides of the band. In general, padding can be performed with values determined based on a few of the set of Np noisy channel estimates, which include simply mirroring the channel estimates or a MMSE estimate based on this set. The number of zeros to be inserted on each side depends on the "unused" subcarriers at both edge and the spacing P. In 409, an N1-point IFFT is applied to the resulting zero padded vector to obtain a time-domain channel of length-N1.

In 411, the power on each of the N1 IFFT samples is estimated recursively. Even though the a recursive average over time is used in the various embodiments, some embodiments may perform accumulation over spatial channels. In 413, each of the IFFT samples is weighted. For the various embodiments, the weights applied may be any appropriate weights which are derived based on the estimated power on each of the N1 samples, the estimated noise power, and knowledge of the interference power profile. The weighting applied in the various embodiments may be based upon knowledge of the interference and is described in further details herein below.

In 415, zeros are then inserted into the weighted N1 IFFT samples wherein the location at which zeros are inserted depends upon the maximal channel spread and the channel profile characteristics. For example, if the channel stops at length X, the insertion point in the middle of the N1 IFFT samples may be somewhere between X and N1.

A size-N2 FFT is then applied in 417 to obtain the channel estimates for N2 subcarriers. It is then necessary to map the N2 estimates to the usable subcarriers. In general, the N2 window should be aligned with the "subcarrier window" as discussed above and as shown in 421. Every P-th subcarrier of the N2 sample corresponds to a pilot, and thus should be aligned with the pilot positions. In the case of an existing DC carrier, or in any case where gaps occur in the pilot spacing, the pilot should still be aligned which essentially offsets the second half the N2 samples by 1 subcarriers to the right before mapping to the usable subcarriers. Note that the alignment of the size-N2 DFT output to the pilot positions should be maintained at each time step in scenarios for embodiments where a time-varying frequency is present as in the case of frequency-hopping reference signals.

Note that the value at a DC subcarrier is of no concern since it is not a usable subcarrier for data transmission. A similar procedure (and a corresponding right/left shift) may be applied if the uniform spacing is disrupted by a smaller number of positions, that is, reduced as opposed to increased in the case of DC subcarrier.

Because the DFT-based approach will introduce inherent modeling errors at the band edges, an optional processing to improve the estimation accuracy is to apply frequency-domain filtering, as in 423, on a few neighboring pilots to obtain channel estimates for a pre-determined number of subcarriers. These estimates may replace the original estimates obtained via IFFT and FFT procedures.

Figure 5:
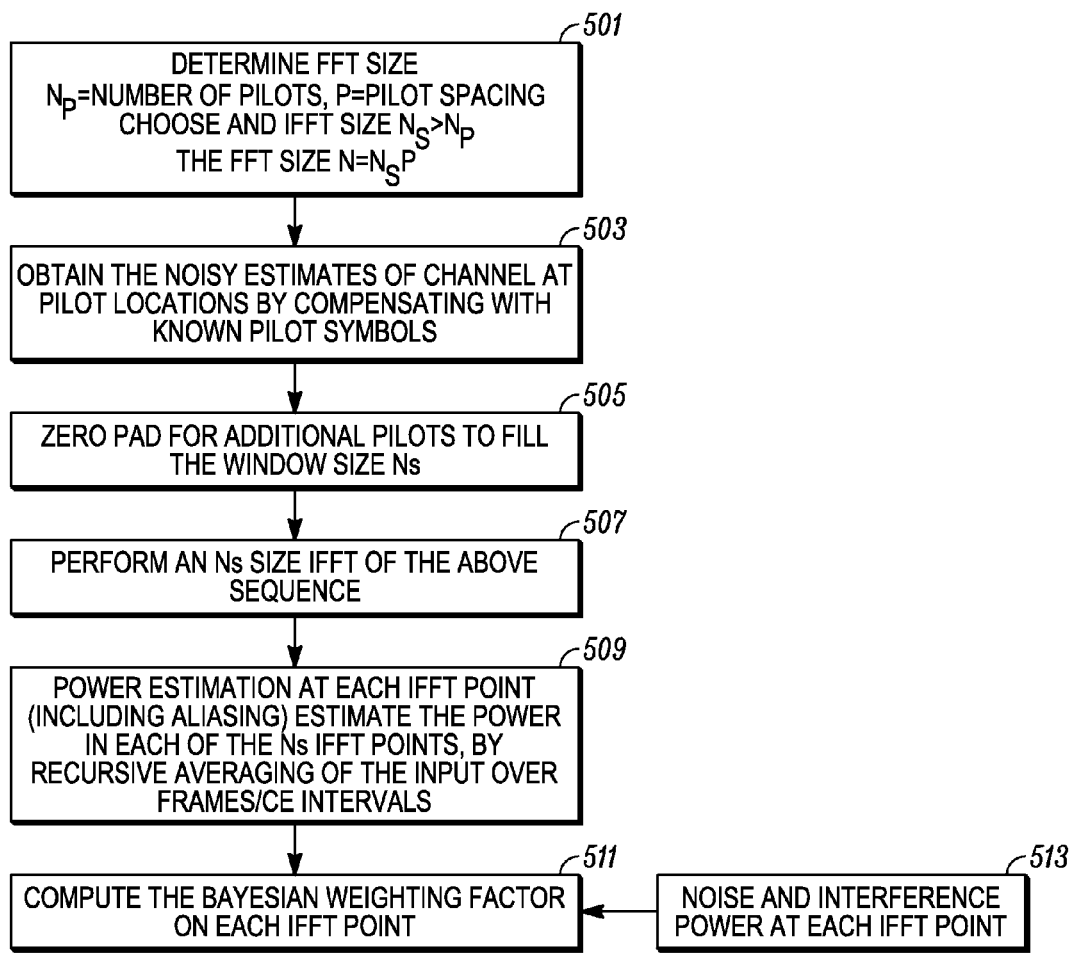
FIG. 5 is a flow chart illustrating further details of operation of a receiver in accordance with an embodiment.
Figure 6:
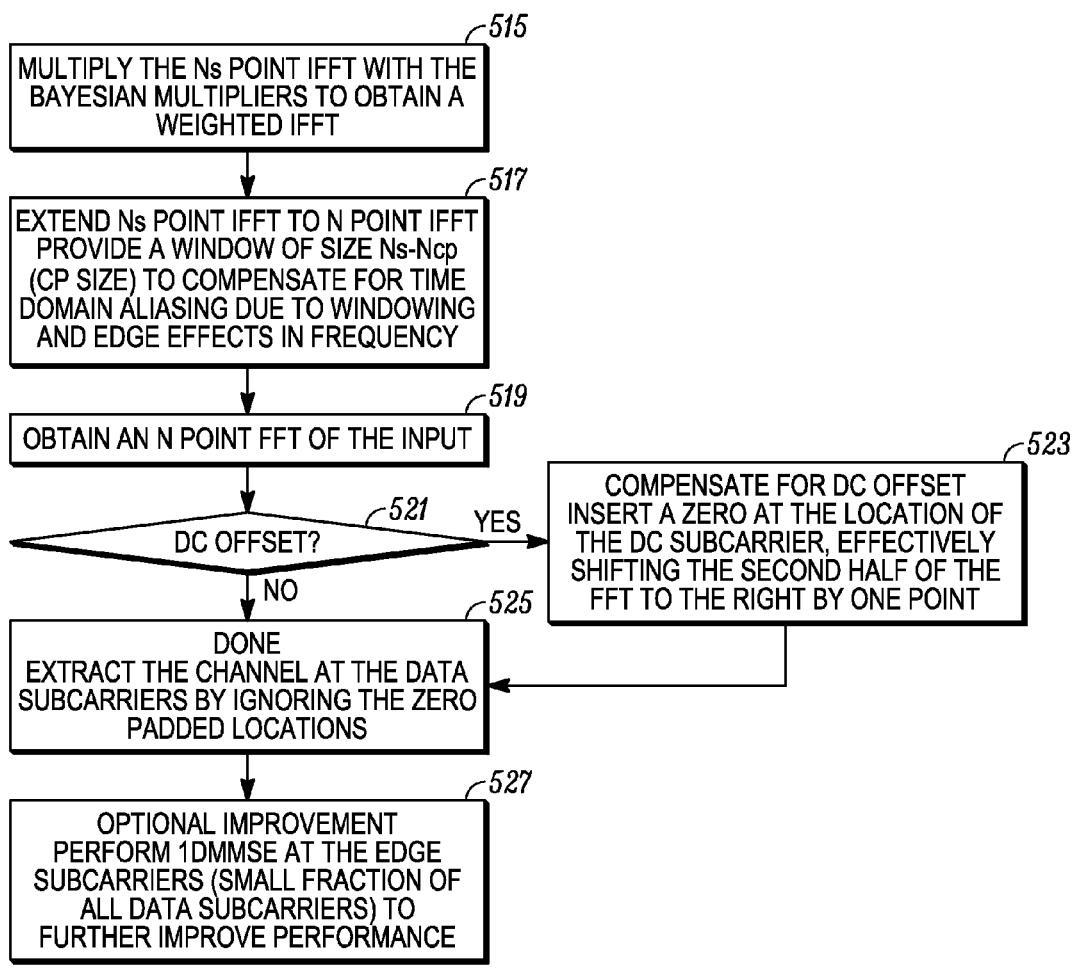
FIG. 6 is a flow chart continuing the operation from the flow chart of FIG. 5.

FIG. 5 and FIG. 6 illustrate further details of operation of a receiver in accordance with the various embodiments. The receiver as in FIG. 5 receives OFDM signals having a frequency domain structure similar to the example illustrated by FIG. 3, proceeds as in 501. Thus, in 501 an FFT/IFFT size is determined.

A FFT size including guard subcarriers defines the actual FFT size, for example 512 carriers, and is defined as "N." The number of data subcarriers is determined, for example 300 subcarriers as illustrated by FIG. 3, and the number of pilots among these data subcarriers may be represented by $N_p$. Choosing the IFFT size as the next largest suitable IFFT size (for implementation of efficient FFT/IFFT) where:

$$N_1 > N_p \tag{Eq. 1}$$

Then the FFT size for the reverse operation is given by $$N_2 = N_1 P \tag{Eq. 2}$$

Exemplary values in accordance with the various embodiments and also as illustrated by FIG. 3 may be $N_1=64$ where $N_2=384$.

The noisy channel estimates at the pilot locations is then obtained in 503, by compensating using known pilot symbols, and zero padding is added for additional pilots to complete the determined window size $N_1$. Equations 3 and 4 below provide further example of these operations, that is, denoting the noisy estimates of the channel on the data subcarriers as Y(1:300), obtain pilots available from these data locations and zero padding as in 505, to increase the reduced FFT size to match the FFT size divided by the pilot spacing. For example as shown in FIG. 3, the FFT size of 384 divided by the pilot spacing of 6 is 64 and thus given:

$FFT$ Window=[64:447] (i.e, length-384)

Data Window=[105:405]

$$H_p = [0, \ldots 0, Y(1:6:300), 0 \ldots 0]; \tag{Eq. 3}$$

In other embodiments, the noisy estimates within the vector $H_p$ may be surrounded with values dependent on the Y values rather than zeros in order to reduce the severity of edge effects in the DFT interpolation.

An IFFT may be performed, as in 507, of the padded pilot sequence wherein:

$$h = ifft(H_p) \tag{Eq. 4}$$

In 509, power estimation is done at each IFFT point. In existing systems, a PDP is estimated for "L" taps defined by the maximum length of the channel. However, an aliased channel has non-zero power at each IFFT point, even if the actual channel is shorter that the number of IFFT points due to over-sampling, and limiting the power profile estimation to the channel taps will degrade the performance at high SNRs. The power estimation of the various embodiments therefore is unlike previous existing systems which recommend obtaining a PDP estimate as $PDP_{inst,n} = [|h_1|^2 \ldots |h_L|^2]$. Thus in 509, the power estimation at time n may be computed as:

$$P_{inst,n} = [|h_1|^2 \ldots |h_{N_1}|^2] \qquad \text{(Eq. 5)}$$

$$P_{avg,n}(i) = \alpha P_{inst,n}(i) + (1-\alpha) P_{avg,n-1}(i),$$

$$i = 1, 2, \ldots N_1$$

$$\alpha = 0.1$$

α should be small enough to get a good estimate of the power profile but not so small that averaging doesn't capture the variation of the long term changes in the power delay profile. Therefore, it is a function of vehicular speed/Doppler, but a value of 0.1 is typically applicable in most cases. Note that the aliased PDP can also be accumulated over multiple spatial channels, in addition to over time (i.e., over pairs of receive and transmit antenna). Other embodiments of this power estimation step may include forms of filtering other than this simple autoregressive structure.

In 511, the Weighting factors at each FFT point may be determined for example by:

$$B_i = \frac{(P_{avg}(i) - \sigma^2)}{P_{avg}(i)} \approx \frac{E_i}{(E_i + N_o)} \qquad \text{(Eq. 6)}$$

where $\sigma^2$ and $E_i$ are the noise variance estimate and the desired signal power at each IFFT point from 513 and the time index n on the power estimate has been suppressed for notational simplicity.

Continuing now with FIG. 6, in 515, a weighted IFFT is obtained by multiplying the channel with Weighting and thus:

$$h(i) = h(i)B_i, i=1, 2, \ldots, N_1 \qquad \text{(Eq. 7)}$$

In 517, the under-sampled channel is extended to size $N_2$, by maximizing the captured power in the aliased channel. Conventional approaches zero-pad, for example, by: $h^{384} = [h(1), \ldots h(64), 0^{384-64}]$. Unlike this conventional approach the various embodiments define a window at negative/high frequency taps to provide for aliasing power due to edge effects and windowing, thus:

$$h^{384} = [h(1), \ldots h(64-d), 0^{384-64}, h(64-d+1), \ldots h(64)] \qquad \text{(Eq. 8)}$$

where d is a variable parameter wherein:

$$d \leq N_1 - L \qquad \text{(Eq. 9)}$$

L is defined as the maximum channel length. For LTE, the cyclic prefix is limited to 40 taps, which corresponds to an upper bound on the delay of a channel. Hence, in one embodiment the value d can be chosen as:

$$d = 64 - 40 = 24 \qquad \text{(Eq. 10)}$$

Note that if the channel has a significant path at maximal excessive spread, it will show as a few taps beyond a 40-th tap due to the aliasing effect, in which case d may be chosen to be something smaller. In the extreme case, when the 'un-aliased' channel power profile is approximately uniform and leakage is observed on both sides of the channel, it is preferable to chose $$d = \frac{(N/D) - L}{2}.$$

Even so, since the path at the maximum spread is often much weaker than the first-arriving paths assuming an exponential or similar monotonously decreasing power delay profile of the "un-aliased" channel, it is better to choose d as $$\frac{(N/D) - L}{2} \leq d \leq (N/D) - L.$$

In general, the approach is to provide the window split (which is [0 40],[41 64] in this example here assuming exponential profile or [0 52],[53 64] with uniform profile) depending on the aliased channel.

In 519 the reconstructed channel on the window may be obtained by:

$$\hat{H}_w = fft(h^{384}) \qquad \text{(Eq. 11)}$$

The channel estimates on the data subcarriers being given by:

$$\hat{H}_d = [\hat{H}_w((N-K)/2) \ldots \hat{H}_w(N-(N-K)/2)] \qquad \text{(Eq. 12)}$$

As was discussed briefly above, with a DC subcarrier, the pilot spacing is not maintained around the DC, since the DC subcarrier is skipped for pilot allocation. For example, if the regular pilot spacing is P, around the DC subcarrier, the spacing is P+1. One of the approaches typically considered to compensate for this effect is to take two reduced length FFTs, one for each half However in the embodiments, only one FFT is required.

Therefore, if in 521 a DC offset exists then the receiver will obtain the sampled pilots and collapse to obtain N/K pilots, neglecting the asymmetric spacing, and then insert a zero at the location of the DC subcarrier, effectively shifting the second half of the subcarriers by 1. Therefore for 523:

$$\hat{H}_d = [\hat{H}_w((N-K)/2) \ldots H(N/2), 0, H(N/2+1) \ldots \hat{H}_w(N-(N-K)/2)] \qquad \text{(Eq. 13)}$$

The channel is extracted at the data subcarriers by ignoring the zero padded locations as in 525. If the opposite effect is seen, where a pilot spacing is less than the uniform value, for example, spacing of D−1 in the center, then the modified/aligned channel estimates are obtained by deleting the additional estimate generated.

$$\hat{H}_d = [\hat{H}_w((N-K)/2) \ldots H(N/2-1), H(H/2+1) \ldots \hat{H}_w(N-(N-K)/2)]$$

Non-uniform spacing in general is compensated by a combination of the above two alignment steps, which involve zero-insertion/additional estimate deletion for increase or decrease with respect to the uniform spacing seen between majority of pilot pairs in the band. When an estimate is required at a skipped location(s) (the pilot spacing being larger than the regular spacing), in place of zero insertion, one of the alternatives of either repetition of nearby estimates or filtering of nearby pilots according to MMSE filtering of nearby estimates may be performed.

In 527 a Further Improvement for Edge Subcarriers may be applied as an option in some embodiments. The above discussed method of operation of the embodiments may be further improved by combining its use with the application of a frequency-domain Minimum Mean Square Error (MMSE) estimator. The performance of DFT-based estimation is somewhat degraded at the band edges relative to center of band performance due to interpolation-induced ripple. Only for some edge subcarriers, a few simple MMSE filters, applied on neighboring pilots only, may be used to estimate the channels at those edge subcarrier locations and used to replace the estimates obtained from the above DFT-based method. With frequency selective scheduling, a codeword may be transmitted exclusively on a band in frequency, and to improve performance for those bands near the edge, the above MMSE approach is useful at high SNRs.

Figure 7:
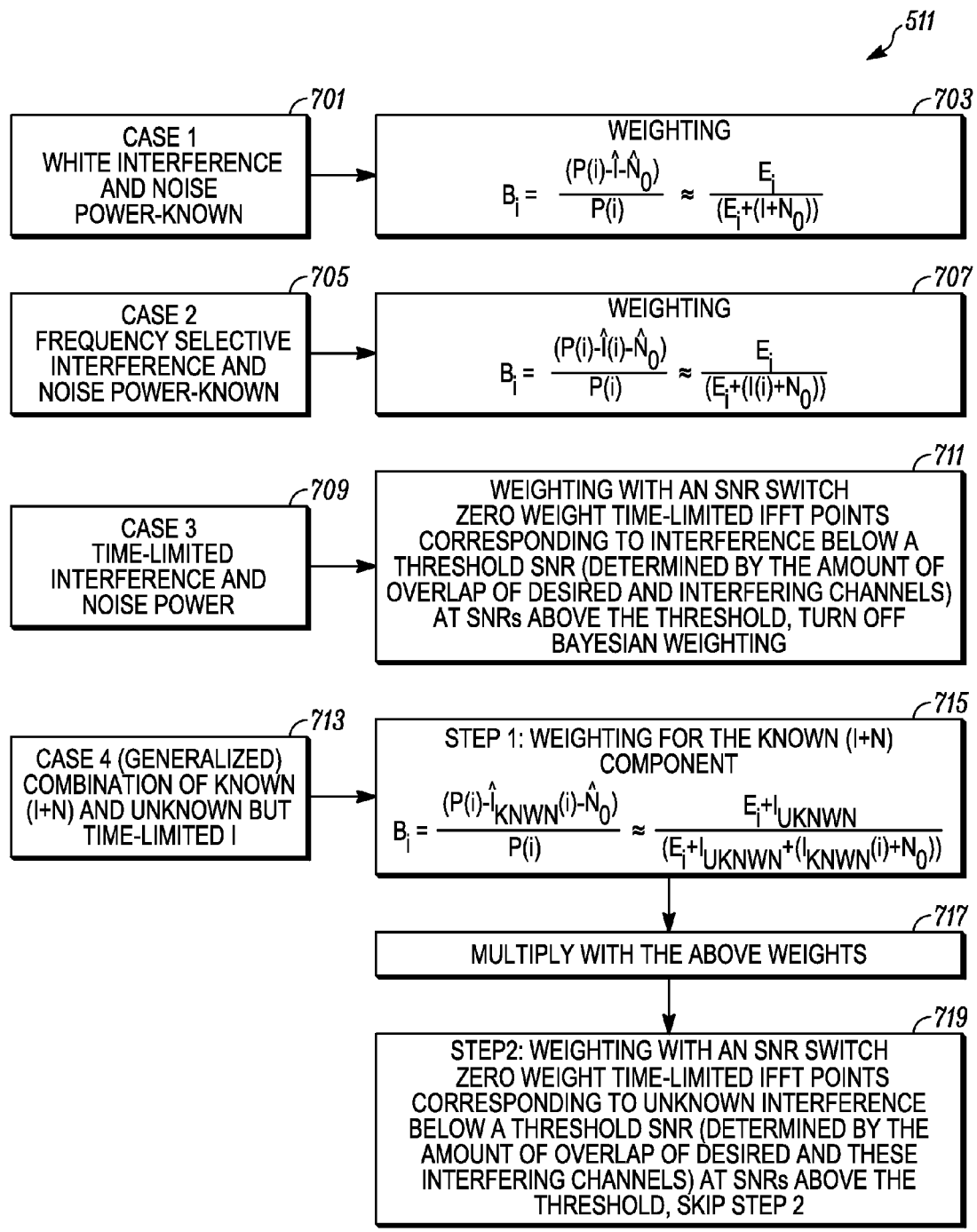
FIG. 7 provides further details corresponding to block 511 of FIG. 5, with respect to the determination of weighting factors.
Figure 8:
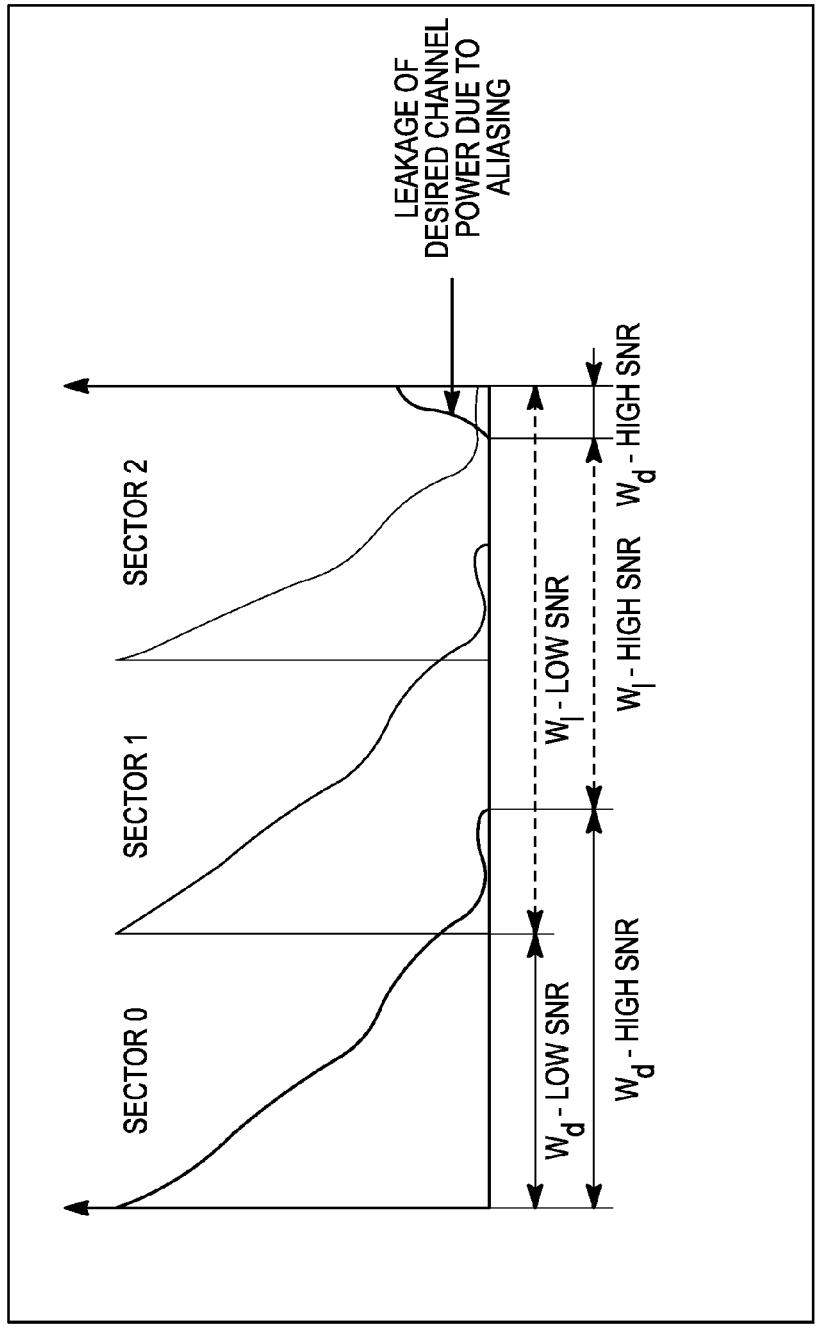
FIG. 8 is a graph illustrating an example of time-limited interference at a base station.
Figure 9:
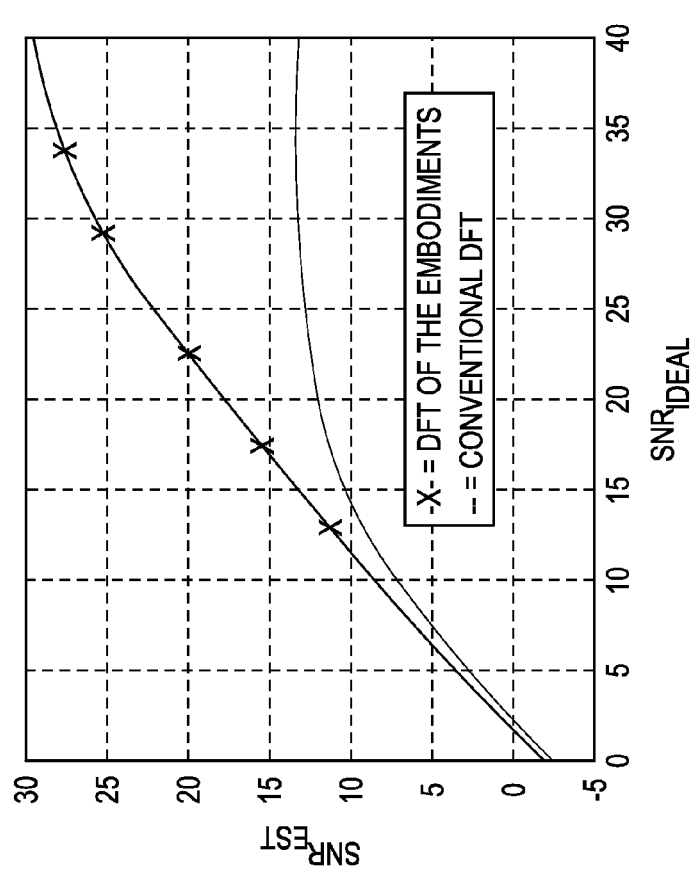
FIG. 9 is a graph of simulation results for a receiver in accordance with an embodiment, comparing a DFT approach of the embodiments to that of conventional receivers.

Turning now to FIG. 7, further details are provided of various Weight Computation with Interference as used in the various embodiments and as shown previously in general in 511 of FIG. 5. In existing systems, weight computation is applied in the case of white noise. However, interference behavior is more general, and thus the various embodiments may exploit knowledge of the interference structure to provide additional performance gains over conventional approaches.

Thus for the case of known white Interference and Noise Power, as illustrated by 701 and 703 the weights are given by:

$$B_i = \frac{(P(i) - \hat{I} - \hat{N}_o)}{P(i)} \approx \frac{E_i}{(E_i + (I + N_o))} \quad \text{(Eq. 14)}$$

In this case, the interference and noise are white on all the channel taps (more specifically all IFFT points) and their values (or sum of their values) may be estimated.

Blocks 705 and 707 illustrate the case of known non-white interference and noise power which is slightly different from the case in 701 and 703, because the interference power varies on each tap. The weights in 705 and 707 are given as follows $$B_i = \frac{(P(i) - \hat{I}(i) - \hat{N}_o)}{P(i)} \approx \frac{E_i}{(E_i + (I(i) + N_o))} \quad \text{(Eq. 15)}$$

Blocks 709 and 707 illustrate the case of time-limited interference and noise power where no estimates of the per tap interference power are available. For this case, as shown in 711, the time-limited IFFT points corresponding to interference below a threshold SNR (determined by the amount of overlap of desired and interfering channels) are truncated. At SNRs above the threshold, weighting is turned off. If the desired channel and the interfering channel are perfectly non-overlapping then no SNR switch is required. In general, however, there is an overlap, and depending on the SNR, an optimal window (1/0 weighting on this window) is selected for the various embodiments.

Blocks 713, 715, 717 and 719 illustrate a generalized interference case where the interference is a combination of known (I+N) and unknown, but approximately time-limited, interference. The generalized case consists of two steps, that is, in 715 determining the Weighting for the known (I+N) component, which may or may not be time-limited:

$$B_{ai} = \frac{(P(i) - \hat{I}_{knwn}(i) - \hat{N}_o)}{P(i)} \approx \frac{E_i + I_{uknwn}}{(E_i + I_{uknwn} + (I_{knwn}(i) + N_o))} \quad \text{(Eq. 16)}$$

and second, depending on the SNR in 719, identifying the window in the first time domain vector, where the significant portion of the interference power and a small portion of desired channel power is concentrated and truncating these approximately time-limited IFFT points corresponding to unknown interference.

For example, if the fraction of the desired signal power in the interference window (chosen to include most of the interference power) is 0.1, we may, for example, set an SNR threshold of 10 dB, where below this SNR hard weighting/truncation is performed over this window, and above this SNR, the size of the truncation window is reduced (if some knowledge of desired channel power delay profile is available) or weights corresponding to the step are set to zero for all the taps, thus:

$$B_{bi} = 0, \quad i \in W_d \quad \text{(Eq. 17)}$$
$$= 1, \quad i \in W_I$$

where $W_d$, $W_I$ are windows where the desired signal and the interfering signal are present.

Figure 10:
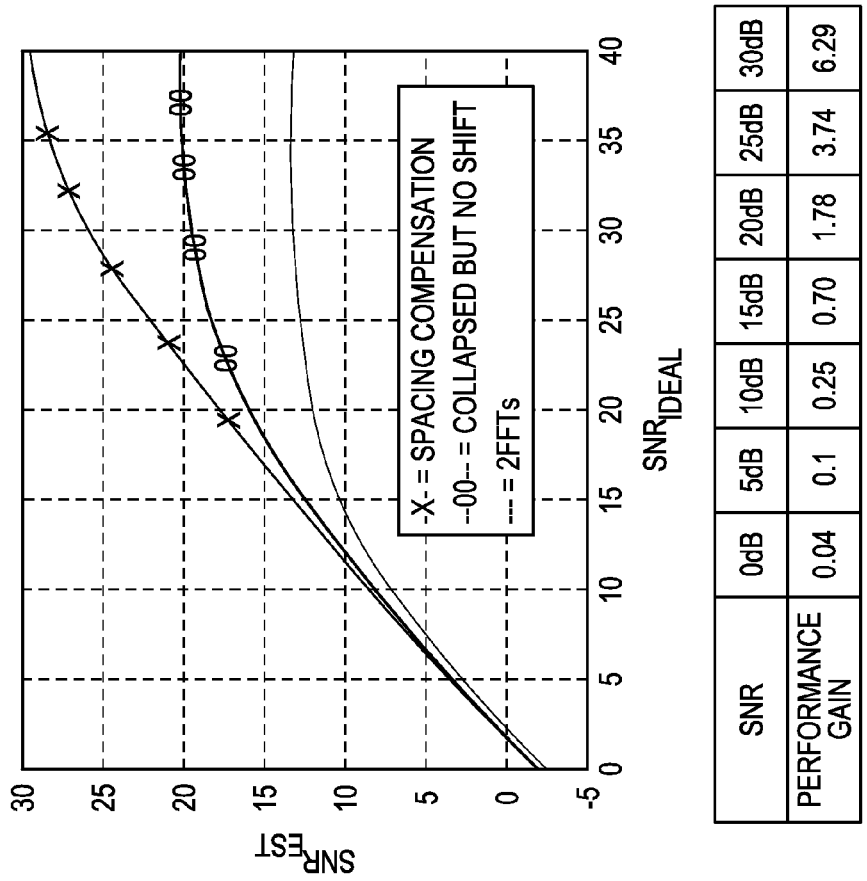
FIG. 10 is a graph of simulation results for a receiver of the embodiments comparing various handling of a DC subcarrier (i.e., additional gaps in pilot spacing).

FIG. 10 provides an example of time-limited interference that may occur with respect to sectored base stations where the interference is intra-sector interference. Two-thirds of the taps are expected to include most of the interference. As shown in FIG. 10, at low SNRs, the power on these taps may be truncated in the various embodiments. The loss due to truncation of desired power due to this truncation is minimal compared to interference cancellation. However at high SNRs, because a desired channel is not typically known except to the extent that it is time-limited to the length of the Cyclic Prefix (CP), we may in the embodiments turn off weighting for second step. Thus the weights for the generalized interference case are given by combining the ones obtained in the two steps:

$$B_i = B_{ai} B_{bi} \quad \text{(Eq. 18)}$$

It is to be note that the generalized interference case of the embodiments corresponds to the interference mix in systems such as 3GPP LTE, where the inter-site interference is flat (as is adaptive white Gaussian noise (AWGN)), and the intra-site interference, that is, interference from other sectors within the same site, is time limited to one-third of the taps.

It is also noted that a similar case can be achieved in a multiple antenna transmission with CDM pilots instead of FDM pilots. With CDM, at each subcarrier location, pilots corresponding to each antenna are pseudo-orthogonalized by multiplication with a complex code sequence. This typically translates into time-limited interference from other antennas for a given antenna. Note that even in high SNR region, interference from other antennas is not low, since these channels are also from the desired base station. In such a case, enough separation (orthogonality) should be provided between channels corresponding to individual antennas, to avoid a upper bound on maximum achievable SNR due to overlap. This can be achieved by more pilots/reduced pilot spacing, resulting in a larger number of IFFT taps to incorporate channels of all the antennas without significant overlap. With this ensured, the embodiment here directly extends to this case.

Figure 11:
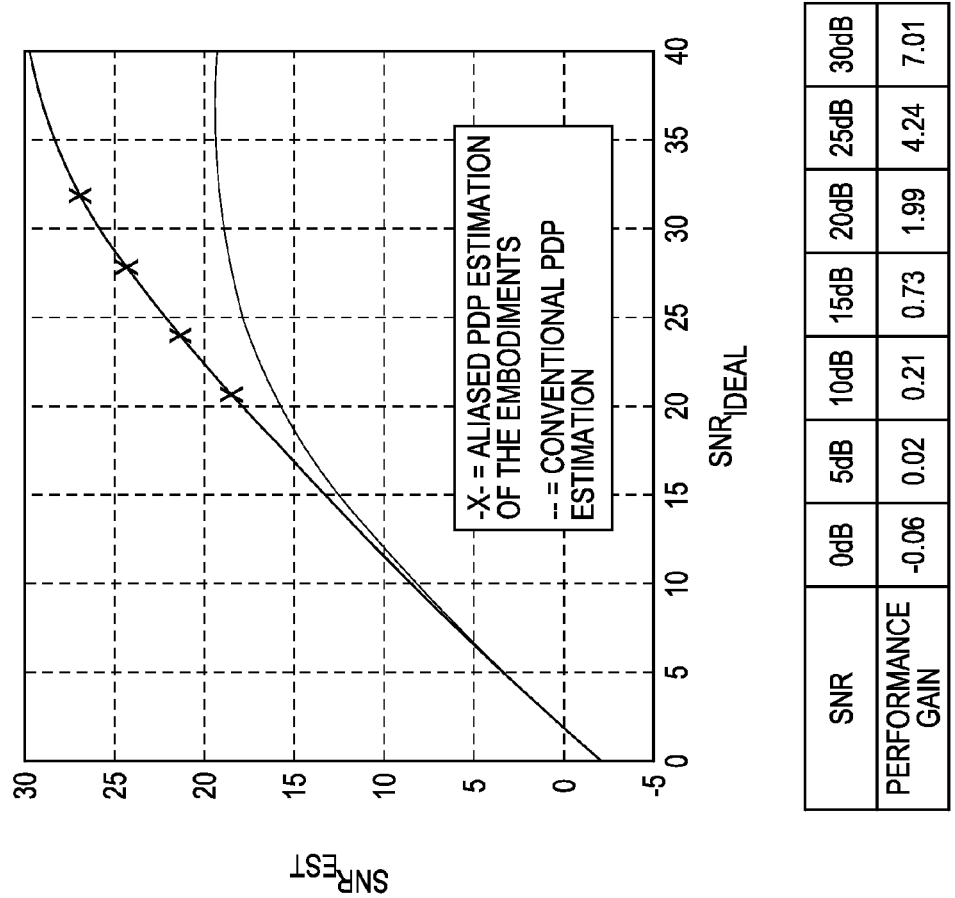
FIG. 11 is a graph of simulation results for a receiver in accordance with an embodiment with aliased PDP estimation compared to a prior PDP estimation.
Figure 12:
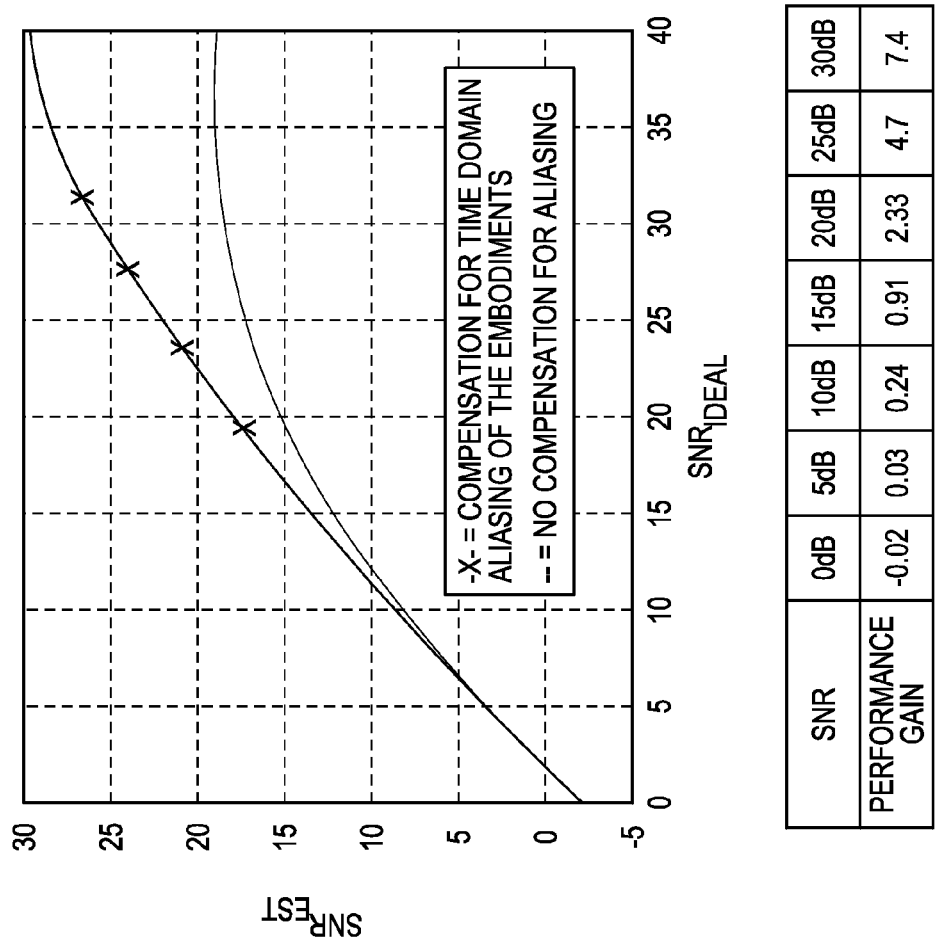
FIG. 12 is a graph of simulation results for a receiver in accordance with an embodiment with compensation for time domain aliasing compared to a prior receiver without such compensation.

FIG. 11 through FIG. 12 illustrate numerical results obtained from simulations based on the 3GPP LTE pilot reference structure, with a TU channel, with maximum delay of 4.7 us, which corresponds to 40 taps, same as the length of CP. A flat interference profile was assumed. To illustrate the performance improvement achievable with the various embodiments, simulations were performed for each of the various aspects of the various embodiments disclosed herein. Thus FIG. 10 provides a performance comparison of the DFT approach of the embodiments with conventional systems.

FIG. 11 provides comparison of the various techniques herein disclosed for handling a DC subcarrier or otherwise gaps in pilot spacing. FIG. 11 illustrates the PDP estimation of the embodiments compared to conventional systems, while FIG. 12 compares the compensation for time domain aliasing as in the embodiments with systems applying no compensation.

Thus various receiver apparatuses and methods have been disclosed that do not suffer performance degradation/flooring over conventional receivers employing DFT schemes at all SNRs. Thus the various receiver apparatuses and methods herein disclosed compensate for aliasing, aliased PDP estimation and DC imperfection.

It is to be understood that the various embodiments and inventive principles and concepts discussed and described herein may be particularly applicable to receivers and associated communication units, devices, and systems providing or facilitating voice communications services or data or messaging services over wide area networks (WANs), such as conventional two way systems and devices, various cellular phone systems including, but not limited to, analog and digital cellular, and any networks employing Spatial Division Multiple Access (SDMA), Spatial Division Multiplexing (SDM), Orthogonal Frequency Division Multiple Access (OFDMA), Orthogonal Frequency Division Multiplexing (OFDM) and any variants thereof.

Principles and concepts described herein may further be applied in devices or systems with short range communications capability normally referred to as W-LAN capabilities, such as IEEE 802.11, Hiper-LAN or 802.16, WiMAX, digital video broadcasting (DVB), and the like that may further utilize CDMA, frequency hopping, orthogonal frequency division multiplexing, or TDMA technologies and one or more of various networking protocols, such as TCP/IP (Transmission Control Protocol/Internet Protocol), IPX/SPX (Inter-Packet Exchange/Sequential Packet Exchange), Net BIOS (Network Basic Input Output System) or other protocol structures.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of operating a receiver, said method comprising:
    transforming a received signal into a frequency domain signal, said received signal having a number of subcarrier channel locations;
    determining a time-domain vector from a set of pilot subcarriers of said received signal, wherein determining a time-domain vector, further comprises:
        determining a spectral window size, said spectral window size based upon said number of subcarriers;
        computing a first channel estimate vector from said set of pilot subcarriers, said pilot subcarriers having a given spacing in the frequency domain;
        inserting a first set of padding values, said first set of padding values corresponding to a set of subcarriers at both edges of said window, into said first channel estimate vector;
        determining a time-domain vector from said first channel estimate vector having said padding values; and
        weighting said time-domain vector according to a set of weighting factors to obtain a weighted time-domain vector;
    providing compensation for time domain aliasing in said time-domain vector, wherein providing compensation for time domain aliasing further comprises:
        inserting a set of padding zeros into said weighted time-domain vector, starting from a position based on a maximum channel spread and channel characteristics; and
        obtaining a second time-domain vector;
        transforming said second time-domain vector into a frequency-domain channel estimate vector;
        mapping said frequency-domain channel estimate vector to said subcarriers of said spectral window; and
        providing compensation for irregularity in said spacing of said pilot subcarriers; and
    obtaining a channel estimate vector.

2. The method of claim 1, wherein providing compensation for irregularity in said spacing of said pilot subcarriers, further comprises:
    inserting a value into said frequency-domain channel estimate vector at an additional subcarrier location, if a subcarrier spacing is larger than an average spacing of said pilot subcarriers; or
    deleting a value from the frequency-domain channel estimate vector, for a subcarrier spacing being smaller than said average spacing of said pilot subcarriers.

3. The method of claim 1, wherein transforming a received signal into a frequency domain signal, said received signal having a number of subcarrier channel locations, further comprises:
    performing an n-point Fast Fourier Transform (FFT) on said received signal.

4. The method of claim 1, further comprising:
    computing Minimum Mean Square Error (MMSE) frequency-domain channel estimates for a predetermined number of subcarriers at both edges of said spectral window; and
    replacing channel estimates from said frequency-domain channel estimation vector with said MMSE channel estimates.

5. The method of claim 1, wherein determining a spectral window size, said spectral window size based upon said number of subcarriers having a given frequency domain spacing, further comprises:
    determining a Fast Fourier Transform (FFT) size and an Inverse Fast Fourier Transform (IFFT) size based upon a number of Orthogonal Frequency Division Multiplexed (OFDM) pilots having a given pilot spacing wherein the FFT size is determine based upon the number of said pilots times said pilot spacing and said IFFT size is determined such that the number of said pilots is less than said number of subcarriers.

6. A method of operating a receiver, said method comprising:
    transforming a received signal into a frequency domain signal, said received signal having a number of subcarrier channel locations;
    determining a time-domain vector from a set of pilot subcarriers of said received signal, wherein determining a time-domain vector, further comprises:
        determining a spectral window size, said spectral window size based upon said number of subcarriers;
        computing a first channel estimate vector from said set of pilot subcarriers, said pilot subcarriers having a given spacing in the frequency domain;

inserting a first set of padding values, said first set of padding values corresponding to a set of subcarriers at both edges of said window, into said first channel estimate vector;

determining a time-domain vector from said first channel estimate vector having said padding values; and weighting said time-domain vector according to a set of weighting factors to obtain a weighted time-domain vector, wherein weighting said time-domain vector according to a set of weighting factors, further comprises:

performing power estimation on each element of said time-domain vector; and computing said weighting factors based upon a noise and interference characteristic and said power estimation;

providing compensation for time domain aliasing in said time-domain vector; and obtaining a channel estimate vector.

7. The method of claim 6, wherein computing said weighting factors based upon a noise and interference characteristic, further comprises:

computing said weighting factors based upon additive Gaussian white noise.

8. The method of claim 6, wherein computing said weighting factors based upon a noise and interference characteristic, further comprises:

computing said weighting factors based upon said noise being frequency selective and having a known noise power.

9. The method of claim 6, wherein computing said weighting factors based upon a noise and interference characteristic, further comprises:

computing said weighting factors based upon time-limited interference and noise power;

identifying a window within said time domain vector, where a largest portion of said interference and noise power is concentrated; and setting weighting factors to zero for each elements of said time domain vector corresponding to said window, that is below a threshold operating signal-to-interference and noise ratio (SINR).

10. The method of claim 6, wherein computing said weighting factors based upon a noise and interference characteristic, further comprises:

computing said weighting factors based upon combining a component for a known noise and interference characteristic with a time-limited component.

11. The method of claim 10, wherein computing said weighting factors based upon combining a component for a known noise characteristic with a time-limited component further comprises:

determining said component for said known noise and interference characteristic;

determining said time-limited component; and computing an overall weighting factor as a product of said component for said known noise and interference characteristic and said time-limited component.

12. A receiver unit comprising:

a receiver component;

a channel estimation component coupled to said receiver component;

a noise determination and weighting component coupled to said channel estimation component;

a window adjustment component coupled to said channel estimation component, said window adjustment component being configured to determine a spectral window size, said spectral window size based upon said number of subcarriers, said subcarrier further comprising a set of pilots having a given frequency domain spacing;

an aliasing compensation component, coupled to said channel estimation component, said aliasing compensation component being configured to insert a set of padding zeros into a weighted estimation vector, starting from a position based on a maximum channel spread and a channel characteristic;

a pilot spacing compensator component, coupled to said channel estimation component and to said window adjustment component, said pilot spacing compensator configured to insert a set of insertions/omissions corresponding to a set of irregularities in pilot spacing; and a channel decoding component coupled to said channel estimation component.

* * * * *